United States Patent
Kunert

(10) Patent No.: US 6,752,409 B1
(45) Date of Patent: Jun. 22, 2004

(54) WHEEL SUSPENSION FOR DRIVEN REAR WHEELS OF A MOTOR VEHICLE

(75) Inventor: Reinhard Kunert, Weissach (DE)

(73) Assignee: Dr. Ing. h.c.F. Porsche AG, Stuttgart (DE)

(*) Notice: Subject to any disclaimer, the term of this patent is extended or adjusted under 35 U.S.C. 154(b) by 0 days.

(21) Appl. No.: 09/914,946

(22) PCT Filed: Feb. 22, 2000

(86) PCT No.: PCT/EP00/01435

§ 371 (c)(1),
(2), (4) Date: Jan. 17, 2002

(87) PCT Pub. No.: WO00/53440

PCT Pub. Date: Sep. 14, 2000

(30) Foreign Application Priority Data

Mar. 6, 1999 (DE) .......................... 199 09 937
Feb. 8, 2000 (DE) .......................... 100 05 407

(51) Int. Cl.⁷ ................................. B60G 3/20
(52) U.S. Cl. ................. 280/124.138; 280/124.139; 280/124.142; 280/124.135
(58) Field of Search .................. 280/124.135, 124.136, 280/124.143, 124.142, 124.138, 124.139

(56) References Cited

U.S. PATENT DOCUMENTS

| | | | |
|---|---|---|---|
| 4,744,586 A | | 5/1988 | Shibahata |
| 4,828,279 A | * | 5/1989 | Matschinsky ........ 280/124.143 |
| 4,863,188 A | * | 9/1989 | Killian ............... 280/124.138 |
| 4,878,688 A | * | 11/1989 | Kubo ................. 280/124.138 |
| 4,991,867 A | | 2/1991 | Washizu |
| 5,116,076 A | * | 5/1992 | Moll ................... 280/124.138 |
| 5,405,162 A | * | 4/1995 | Chun .................. 280/124.143 |
| 5,415,427 A | | 5/1995 | Sommerer |
| 5,992,868 A | * | 11/1999 | Orimoto ............. 280/124.138 |

FOREIGN PATENT DOCUMENTS

| | | |
|---|---|---|
| EP | 0239449 | 9/1987 |
| EP | 0655355 | 3/1996 |
| GB | 1285047 | 8/1972 |
| WO | 92/16386 | 10/1992 |

OTHER PUBLICATIONS

Von Volker Berkefeld, "The LSA–Hinterradaufhangung of the New Porsche 911 Carrea" ATZ Automobile Magazine, 1994.
Copy of the International Search Report.

* cited by examiner

*Primary Examiner*—Ruth Ilan
(74) *Attorney, Agent, or Firm*—Crowell & Moring LLP

(57) ABSTRACT

A wheel suspension is connected to a wheel carrier, which is connected to the vehicle body or an auxiliary frame via wheel guide members spaced vertically apart from each other. The wheel guide members are arranged above and below a horizontal plane. An elastokinematic axis and a kinematic trailing axis are formed, which results in an ideal swivel axis for the wheel. The wheel guide members comprise two open wishbones, which diverge in the direction of the body-sided bearings and are disposed in two planes, are spaced apart, and are hinged to the wheel carrier on both sides of a vertical wheel center transverse plane. The wheel guide members comprise an A-frame arm and a steering tie rod, the A-frame arm being hinged in front of the vertical wheel center transverse plane and located in an inclined plane, resulting in a pitching pole for antidive and antisquat.

15 Claims, 5 Drawing Sheets

WHEEL SUSPENSION FOR DRIVEN REAR WHEELS OF A MOTOR VEHICLE

BACKGROUND AND SUMMARY OF THE INVENTION

The invention relates to a wheel suspension for the driven rear wheels of a motor vehicle comprising a wheel-supporting wheel carrier, which is connected to a vehicle body or an auxiliary frame, and fastened by way of wheel guide members, which are spaced vertically apart from each other; the wheel guide members being arranged above and below a horizontal plane, running through a spin axis, and being employed in such a manner and mounted on the wheel carrier and on the vehicle body that an elastokinematic axis and a kinematic trailing axis are formed at the wheel; the wheel guide members arranged above the spin axis comprise two upper wishbones, which diverge in a direction of body-sided bearings and are disposed in two planes, which are spaced apart, and are hinged to the wheel carrier on both sides of a vertical wheel center transverse plane, and wheel guide members arranged below the spin axis comprise an A-frame arm and a steering tie rod, whereby the A-frame arm is hinged in front of the vertical wheel center transverse plane.

The German Patent Document DE 19 38 850 C3 discloses a wheel suspension, where the upper suspension link plane comprises two open wishbones, diverging in the direction of the longitudinal center axis of the vehicle. The bottom suspension link plane comprises an A-frame arm, whereby the links or the position of the links result in an elastokinematic axis. Furthermore, the US Report on the Sixth International Technical Conference on Experimental Safety Vehicles on Oct. 12, 1976, pages 656 to 664, discloses a wheel suspension with upper open wishbones and a bottom A-frame arm with a steering tie rod, both of which together form an elastokinematic axis and a trailing axis. Furthermore, the German Patent Document DE 37 14 034 C1 discloses a wheel suspension for the driven rear wheels of motor vehicles with upper open suspension links and a bottom A-frame arm with a pendulum support. The result is a pitching pole for starting and braking torque compensation via the body-sided bearings and the wheel carrier-sided bearings of the A-frame arm.

The WIPO Publication WO-A-92/16386 discloses a wheel suspension for the driven, hinged and unhinged rear wheels of a motor vehicle with a wheel carrier, which is supported on the body side by way of a spring strut. Said wheel carrier is guided by way of two single links, forming an upper hinge and a bottom hinge, comprising an A-frame arm, and a steering tie rod link, which runs approximately in the transverse direction of the vehicle. These individual links diverge in the transverse direction of the vehicle and are mounted in two separated joints of the wheel carrier, whereby the A-frame arm is held on the wheel carrier by way of one joint, and the two hinges form an elastokinematic wheel swivel axis and a kinematic swivel axis. The two hinges are arranged and supported in the joints in such a manner that the result is a wheel suspension that guarantees, on one hand, safe vehicle handling under all driving conditions with good driving comfort and, on the other hand, the wheel suspension is supposed to be designed in a spatially compact form in the vehicle.

The problem on which the invention is based is to improve the prior art wheel suspension in such a manner that it can be designed small and compact and can be preassembled and adjusted and guarantees stable vehicle handling both when cornering and driving straight ahead.

The invention solves this problem in that the A-frame arm is located in an inclined plane, formed in the direction of travel; and the steering tie rod is mounted on the wheel carrier behind the wheel center transverse plane; wherein for all forces acting on the wheel, coordinated bearing characteristics of the wheel guide members and the position of the elastokinematic axis in interaction with the trailing axis result in an ideal swivel axis for the wheel; and wherein predetermined directions of movement of wheel carrier-sided bearings of two links of the wheel guide members, result in pole rays, which intersect in front of and above a horizontal plane, running through the spin axis, and form a pitching pole for antidive and antisquat. Other advantageous features are discussed further, below.

The object of the invention is to provide a wheel suspension for the rear wheels of a motor vehicle, in particular for an all terrain vehicle, which guarantees stable driving behavior when cornering and driving straight ahead under forces acting on the wheel. In addition, the wheel suspension is supposed to be designed small and compact and ought to permit preassembly and adjustment.

The major advantages targeted with the invention lie in the fact that the design of the wheel suspension with the upper open links and a bottom A-frame arm with a steering tie rod and with correspondingly coordinated characteristics in the link bearings results in a wheel suspension that guarantees maximum starting and braking torque compensation. Furthermore, when forces act on the wheel, it is possible to make elastokinematic wheel position changes and exert an understeering effect in the toe-in direction for all forces, like lateral forces, braking forces, and Ferraria forces.

To this end, the wheel suspension comprises, in essence, wheel guide members, which are disposed above a spin axis and comprise two open wishbones, which diverge in the direction of the body-sided bearing and are disposed in two planes that are spaced apart. On both sides of a vertical transverse plane of the wheel center the wishbones are hinged to the wheel carrier. Below the spin axis there are other wheel guide members, comprising an A-frame arm and a steering tie rod. When seen in the direction of travel, the A-frame arm is hinged in front of the vertical wheel center transverse plane and is located in an inclined plane in the direction of travel. The steering tie rod is mounted on the wheel carrier behind the wheel center transverse plane. The pole rays, which run perpendicular to the direction of movement of the wheel carrier-sided bearings of the upper and bottom link, result in a pitching pole, which is located in front of and above the plane, running through the spin axis, and results in an antidive and antisquat effect.

The two upper wishbones are designed, for example, as so-called rod links and form with the bottom wheel guide members an elastokinematic axis, where the two upper wishbones form an ideal upper pole for this axis, and the bottom pole, formed by the steering tie rod and the A-frame arm, is located behind the vertical wheel center transverse plane and outside the track width. Owing to these two poles, the elastokinematic axis experiences an intersection point in the wheel contact plane outside the track width and, when seen in the direction of travel, behind the vertical wheel center transverse plane.

The position of the elastokinematic axis is determined in that the one bearing point of the upper link in front of the vertical wheel center transverse plane lies closer to the vertical wheel center transverse plane than the bearing point of the other bearing of the upper wishbone, which lies behind the vertical wheel center transverse plane.

Furthermore, the two upper wishbones form an ideal upper pole; and the wheel carrier-sided bearing of the bottom A-frame arm forms a constructive pole for the kinematic trailing axis. The intersection point of this trailing axis in the wheel contact plane is located in front of the vertical wheel center transverse plane and inside the track width. To this end, the constructive pole, formed by the A-frame arm in the bearing of the wheel carrier, lies, when seen in the direction of travel, in front of the vertical wheel center transverse plane and inside the track width. In contrast, the upper ideal pole is located approximately in the vertical wheel center in the transverse plane and outside the track width. Thus, this trailing axis exhibits an intersection point in the wheel contact plane.

To achieve the specific position of the kinematic trailing axis and the elastokinematic axis, the bearing points of the upper wishbones are arranged on the wheel carrier between the bearing points of the steering tie rod and the A-frame arm. In this respect the wishbones extend so as to diverge in the direction of the body-sided bearings and, in so doing, cross a link arm of the A-frame arm and the steering tie rod.

Thus, the tendency is to achieve an elastokinematic wheel position change for all forces acting on the wheel, because the characteristics of the link bearings, which are coordinated correspondingly, and the position of the elastokinematic axis and the position of the kinematic trailing axis have an impact on the type and amount of this change in the wheel position.

As a function of the geometric configuration of the wheel guide members and the ideal and constructive poles and axes, which are formed thus, the coordinated characteristics of the bearings of the wheel guide members determine the changes in the wheel position under the influences of the forces on the wheel. The result of the position of the elastokinematic axis and the trailing axis for forces acting on the wheel is an ideal axis between these two other axes, namely the elastokinematic axis and the trailing axis, around which the wheel can move elastokinematically under all forces acting on said wheel.

Thus, the body-sided bearings of the A-frame arm exhibit a significantly stiffer characteristic in the radial load direction than the characteristics in the axial load direction. The radial bearing characteristics of both upper wishbones are altogether identical and exhibit a smaller radial characteristic than the bearing characteristics of the body-sided bearings of the A-frame arm. The radial bearing characteristics of the steering tie rod are designed in total stiffer than the radial bearing characteristics of the bottom wishbones.

In the case of lateral and braking forces as well as longitudinal forces, acting in the opposite direction of travel, the coordination of the bearing characteristics and the position of the elastokinematic axis and the trailing axis are supposed to facilitate superimposing a toe-in movement of the wheel on the effect of a toe-out movement of the wheel, in that the wheel can be adjusted in the direction of toe-in. This adjustment takes place then by way of the ideal swivel axis, which is formed by the two axes and which forms spatially between the elastokinematic axis and the trailing axis and exhibits a point of intersection in an area of the wheel contact plane behind the vertical wheel center transverse plane and outside the track width. For negative longitudinal forces (starting forces), which act in the direction of travel, the wheel position is changed in the direction of toe-out.

The formation of a pitching pole—relative to the direction of travel—in front of and above the spin axis to achieve an antidive effect, that is to prevent the vehicle from rising during a braking operation, and an antisquat effect, that is to prevent the vehicle from dipping at startup, is achieved through the inclined alignment of the A-frame arm and the position of the two upper wishbones.

The shock absorber or spring strut extends at an oblique angle relative to the vehicle in the direction of the vehicle longitudinal center axis and is arranged between the A-frame arm and the steering tie rod and the two wishbones and rests against the wheel carrier and the vehicle body. The result of this inclined configuration of the spring strut is predominantly a relatively large trunk space and low liftover height of the vehicle.

One embodiment of the invention is depicted in the drawings and is described in detail in the following.

DETAILED DESCRIPTION OF THE DRAWINGS

Figure 1:
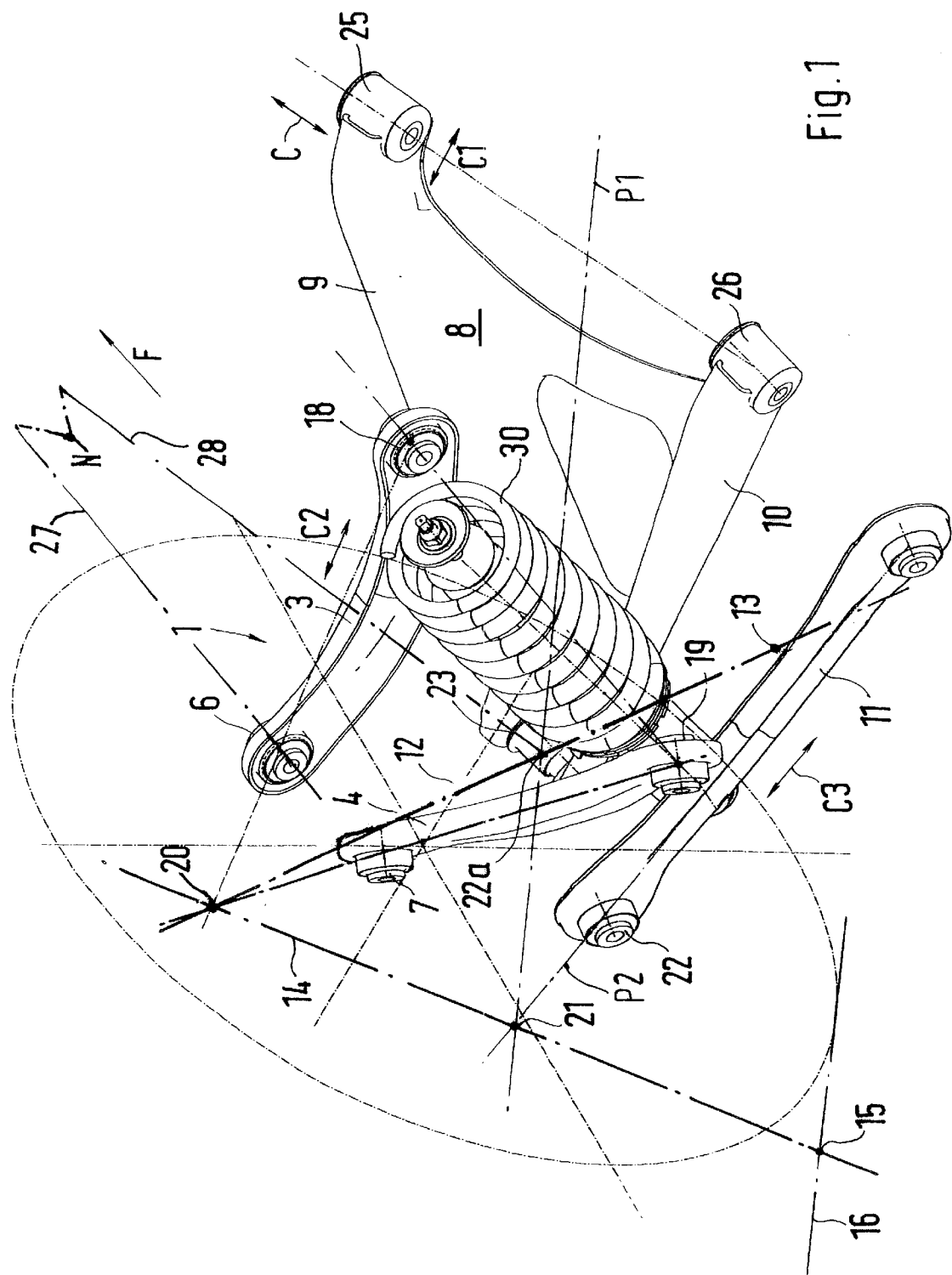
FIG. 1 is a schematic drawing of a wheel suspension.
Figure 2:
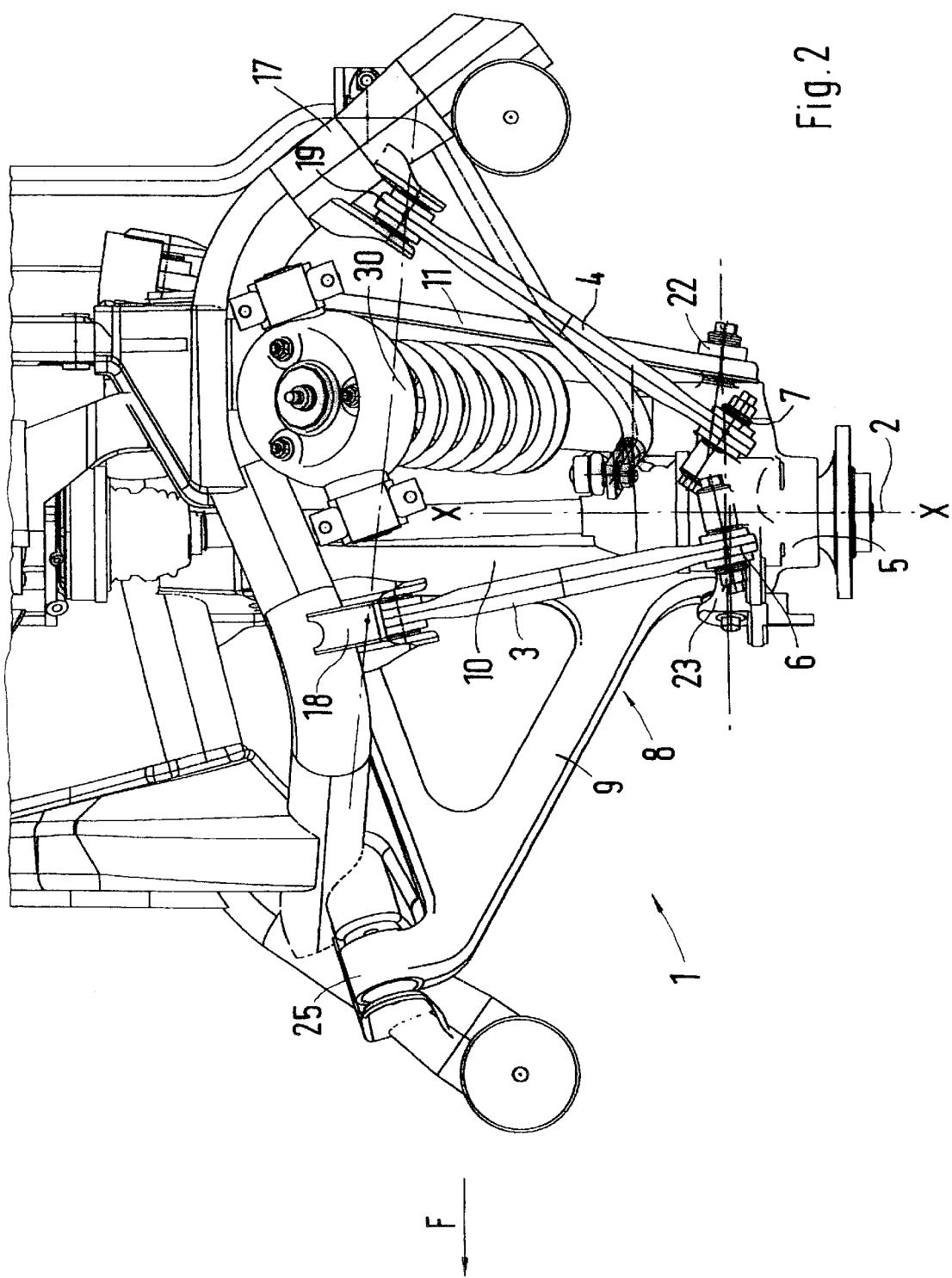
FIG. 2 is a plan view of the wheel suspension in the installed state.
Figure 3:
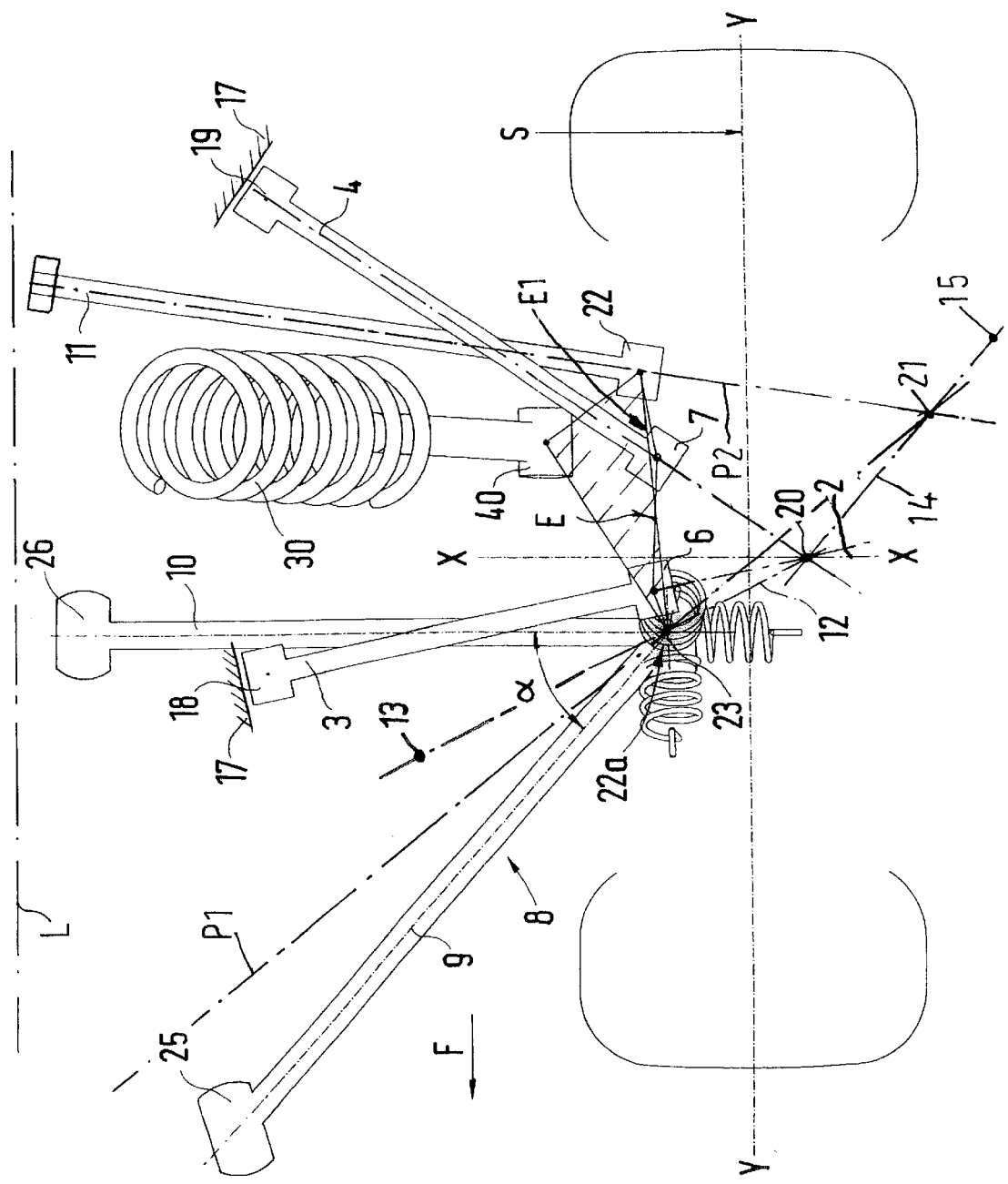
FIG. 3 is a plan view of a schematic drawing of the wheel suspension.
Figure 4:
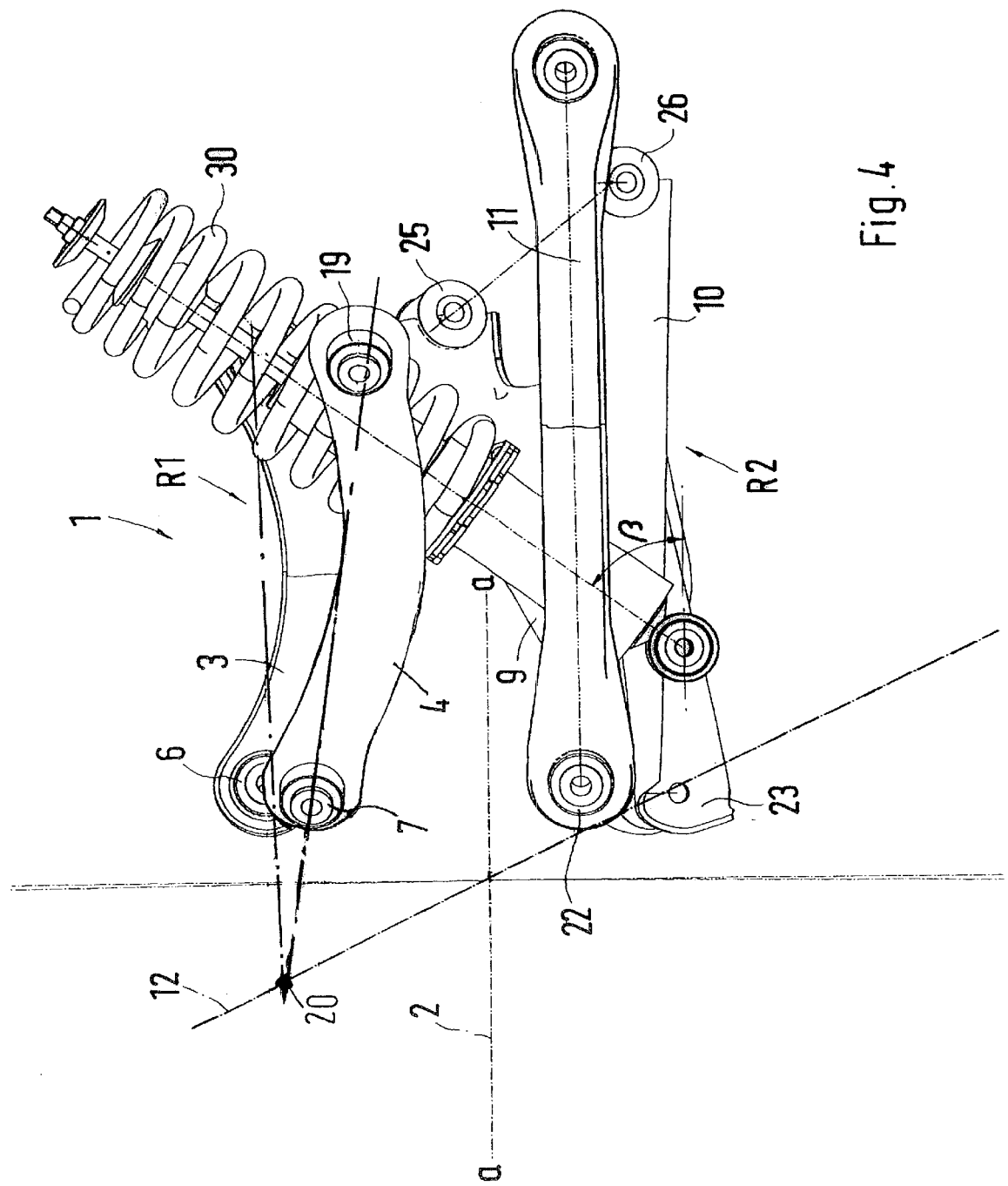
FIG. 4 is a rear view of a schematic drawing of the wheel suspension.
Figure 5:
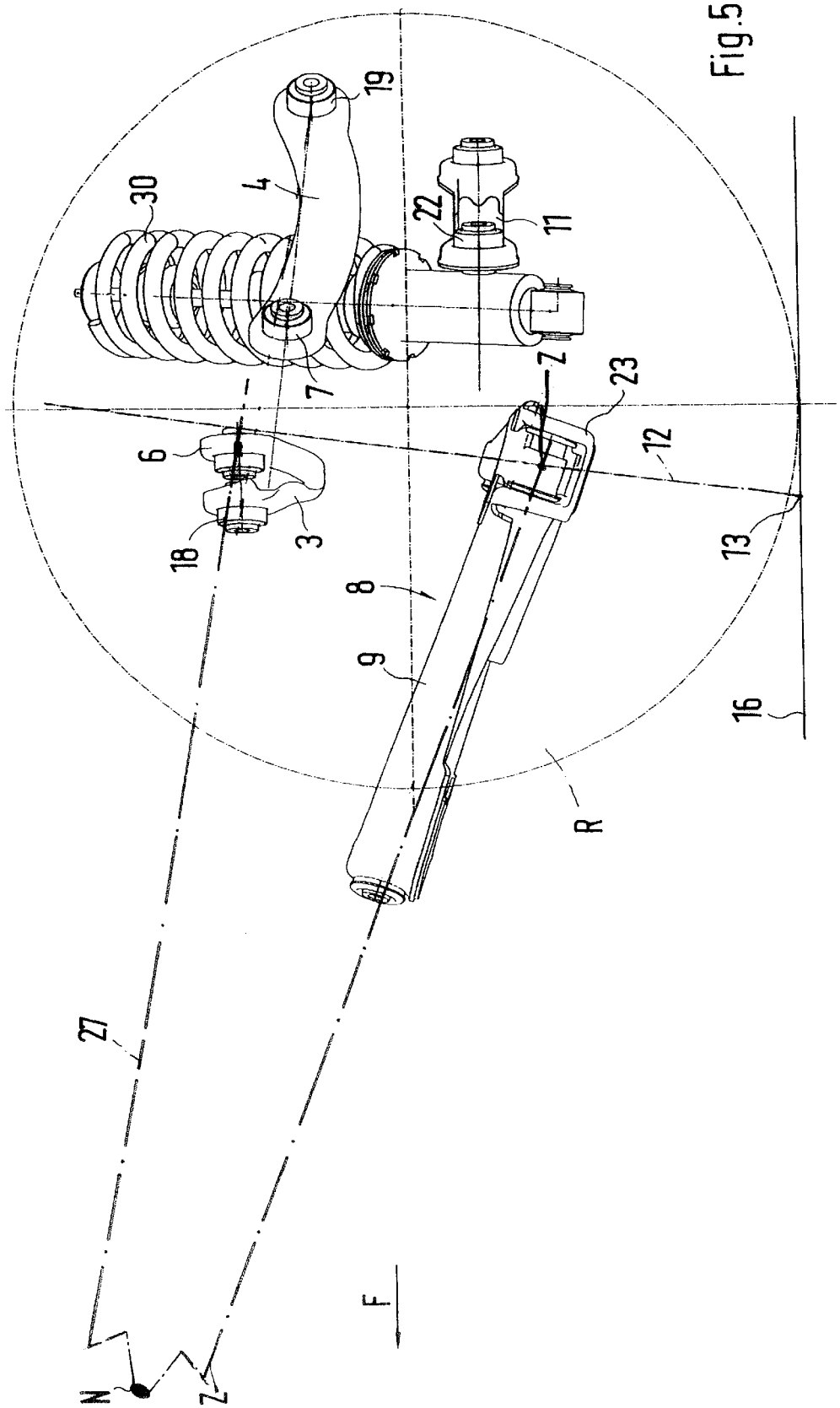
FIG. 5 is a side view of a schematic drawing of the wheel suspension.

The wheel suspension 1 for a rear axle of a motor vehicle, in particular of an all terrain vehicle, comprises a wheel guide member R1, which is arranged above a spin axis 2 and comprises two wishbones 3, 4 and which is hinged to a wheel carrier 5 by means of two bearings 6, 7. Below the spin axis 2 there is another wheel guide member R2, comprising an A-frame arm 8 with link arms 9, 10 and a steering tie rod 11.

The wheel guide members R1 and R2 are disposed in such a manner in the space that the result is a pitching pole N and a kinematic trailing axis 12 with an intersection point or a pole 13 in the wheel contact plane 16 and an elastokinematic axis 14 with an intersection point or a pole 15 in the wheel contact plane 16.

Diverging from the wheel carrier 5, the two wishbones 3, 4 are arranged so as to extend in the direction of the vehicle body or a chassis underframe 17 and are braced on the body side in bearings 18, 19 so as to swivel. The one wishbone 3 is located—when seen in the F direction of travel—in front of a vertical X—X wheel center transverse plane, whereby the bearing 6 is disposed immediately adjacent to this X—X plane. The other wishbone 4 is arranged—with respect to the F direction of travel—behind the vertical X—X wheel center transverse plane, whereby the bearing 7 is spaced farther away from this X—X plane than the bearing 6 of the wishbone 3. The two links 3, 4 are on different height levels.

An upper ideal pole 20, which is formed by the two wishbones 3, 4 and which is intended for determining the kinematic trailing axis 12 and for the elastokinematic axis 14, lies approximately in the vertical X—X wheel center transverse plane or directly adjacent thereto. The bottom ideal pole 21 of the elastokinematic axis 14 is formed by the A-frame arm 8 and the steering tie rod 11 and the A-frame arm 8. This elastokinematic axis 14 exhibits an intersection point 15 in the wheel contact plane 16, which lies—in relation to the F direction of travel—behind the vertical X—X wheel center transverse plane and outside the track width S or the Y—Y wheel center longitudinal plane.

In order for the wheel to move in the toe-in direction under the influence of the forces acting on the wheel, the intersection point 13 of the trailing axis is arranged—in relation to the vertical X—X wheel center transverse plane—in front of said transverse plane and inside the track width S. The intersection point 15 of the elastokinematic axis 14 is arranged behind the vertical X—X wheel center transverse plane and outside the track width S. For the other ideal axis the result of these two axes is an intersection point in the wheel contact plane and in the wheel center plane in an area behind the vertical wheel center transverse plane and outside the track width.

Thus, the goal is reached with the coordinated bearing characteristics of the wheel guide members for forces acting on the wheel that a toe-in movement of the wheel is superimposed on a toe-out movement of the wheel, since, based on the position of the intersection points, the torque ratios are designed correspondingly.

The two wishbones 3, 4 are arranged preferably at different heights, whereby the link 3, located in front, is arranged above the other link 4, located in the rear. This position of the links 3, 4 or one of the link bearings 3 or 4 affects the position of the pitching pole N.

The wheel carrier-sided bearings 6, 7 and 22, 23 of the bottom and upper wheel guide members R1 and R2 are arranged in an approximately vertical skewed plane E, which runs approximately parallel to the vertical Y—Y wheel center longitudinal plane. A vertical plane E, extending through the bearings 6, 7, runs approximately parallel to the vertical Y—Y [vehicle longitudinal center] plane. The other vertical plane E1, extending through the bearings 22, 23, slopes relative to the Y—Y plane.

The A-frame arm 8 comprises a link arm, which is arranged in the vicinity of the vertical X—X wheel center transverse plane and which is arranged virtually parallel to this X—X plane and exhibits another link arm 9, which diverges at an angle ($\alpha$) and projects toward the front. The A-frame arm 8 is mounted on the wheel carrier 5 by way of a bearing 23 and is held on the body side in bearings 25, 26. The result of the characteristics of these bearings 25, 26 is the direction of the pole ray P1, which runs through the bearing 23 and meets with the pole ray P2 of the link 11 at the point 21.

The A-frame arm 8, rising in an inclined plane Z—Z in the F direction of travel, is provided with the wheel carrier-sided bearing 23; and the wishbone 3 is provided with the wheel carrier-sided bearing 6. These two bearings determine in essence with their direction of movement the pole rays 27, 28 and thus the pitching pole N for antidive and antisquat. The pitching pole N is located above and in front of the spin axis 2 in relation to the F direction of travel.

The wishbones 3, 4 exhibit radial bearing characteristics C2 of altogether approximately 3,000 N/mm and more, whereby these elasticities comprise altogether both bearings. The characteristics C and C1 of the link arms 9, 10 of the A-frame arm 8 are approximately the same in the axial direction and amount to approximately 1,000 N/mm. In contrast, a harder characteristic C of approximately 6,000 N/mm is provided in the radial direction. The steering tie rod 11 exhibits altogether a radial characteristic C3 of approximately 7,500 N/mm and is thus mounted significantly harder in the radial direction than the A-frame arm 8 and the upper wishbones 3, 4. The characteristics C, C1, C2, and C3 of the wheel guide members R1 and R2 are designed in such a manner that the results are only slight toe-in and camber changes. For forces acting on the wheel, these small toe-in changes are achieved in essence by way of the moments acting in the opposite direction.

According to another design, the front link bearing 25 (seen in the F direction of travel) of the bottom A-frame arm 8 can be designed soft radially in order to have an optimal effect on the longitudinal comfort in the event of longitudinal shocks or road roughness.

The spring or shock absorber strut 30, which slopes at an angle ($\beta$) in relation to the vehicle longitudinal center axis L, extends in a sloped position between the upper wishbones 3, 4 and between the link 10 of the A-frame arm 8 and the steering tie rod 11.

What is claimed is:

1. Wheel suspension for a driven rear wheel of a motor vehicle, comprising:

an inclined shock absorber strut, and a wheel-supporting wheel carrier, which is connected to the vehicle by way of wheel guide members, which are spaced vertically apart from each other, the wheel guide members being arranged above and below a horizontal plane running through a spin axis, and being mounted on the wheel carrier as well as on a vehicle body, thereby an elastokinematic axis and a kinematic trailing axis are formed at the wheel;

wherein the shock absorber strut is mounted on the wheel carrier on a wheel carrier-side bearing;

wherein the wheel guide member arranged above the spin axis comprises two open wishbones, which diverge in a direction of body-sided bearings, are disposed in two planes, which are spaced apart, and are hinged to the wheel carrier on both sides of a vertical wheel center transverse plane on wheel carrier-side bearings at upper wishbone bearing points;

wherein the wheel guide member arranged below the spin axis, comprises an A-frame arm and a steering tie rod, the A-frame arm being hinged on body-side bearings at body-side bearing points in front of the vertical wheel center transverse plane, and located in an inclined plane, formed in a direction of travel, and mounted to the wheel carrier on an A-frame wheel carrier-side bearing at an A-frame bearing point;

wherein the steering tie rod is mounted on the wheel carrier on a wheel carrier-side bearing at a steering tie rod bearing point behind the wheel center transverse plane;

wherein for all forces acting on the wheel, coordinated bearing characteristics of the wheel guide members and the position of the elastokinematic axis in interaction with the trailing axis result in an ideal swivel axis for the wheel;

wherein predetermined directions of movement of the wheel carrier-sided bearings of two links of the wheel guide members result in pole rays, which meet in front of the wheel center transverse plane and above the horizontal plane running through the spin axis, and form a pitching pole for antidive and antisquat;

wherein an ideal upper pole for the kinematic trailing axis, which lies outside a track width, is formed at an intersection of the longitudinal axes of the two wishbones, a bottom point for the trailing axis is formed by the wheel carrier-side bearing of the A-frame arm, which is located in front of the vertical wheel center transverse plane and inside the track width, and the bearing points of the upper wishbones lie approximately in a vertical plane, which runs approximately parallel to the wheel center longitudinal plane and according to which the bearing points of the steering tie rod and the bottom A-frame arm lie in another vertical plane, which crosses the vertical plane;

wherein the ideal upper pole, formed by the two upper wishbones, for the kinematic trailing axis lies also at the vertical wheel center transverse plane; and wherein a front wishbone of the two wishbones is arranged to cross the link arm of the bottom A-frame arm and also a rear wishbone of the two wishbones is arranged to cross the steering tie rod.

2. Wheel suspension according to claim 1, wherein the body-sided bearings of the A-frame arm exhibit a significantly stiffer characteristic in the radial load direction than a characteristic in the axial load direction, whereby a front body-sided bearing of the A-frame body-side bearings exhibits a softer characteristic in the radial direction than a rear body-sided bearing of the A-frame body-side bearings.

3. Wheel suspension according to claim 1, wherein the radial bearing characteristics of the two upper wishbones are the same and exhibit a smaller radial characteristic than the bearing characteristics of the body-sided bearings of the A-frame arm.

4. Wheel suspension according to claim 2, wherein the radial bearing characteristics of the two upper wishbones are the same and exhibit a smaller radial characteristic than the bearing characteristics of the body-sided bearings of the A-frame arm.

5. Wheel suspension according to claim 1, wherein radial bearing characteristics of the steering tie rod are altogether stiffer than radial bearing characteristics of the two wishbones.

6. Wheel suspension according to claim 2, wherein radial bearing characteristics of the steering tie rod are altogether stiffer than radial bearing characteristics of the two wishbones.

7. Wheel suspension according to claim 3, wherein radial bearing characteristics of the steering tie rod are altogether stiffer than radial bearing characteristics of the two wishbones.

8. Wheel suspension according to claim 1, wherein the wheel carrier-sided bearing of the shock absorber strut lies closer to the wheel carrier-sided bearing of the steering tie rod than to the wheel carrier-sided bearing of the bottom A-frame arm.

9. Wheel suspension according to claim 2, wherein the wheel carrier-sided bearing of the shock absorber strut lies closer to the wheel carrier-sided bearing of the steering tie rod than to the wheel carrier-sided bearing of the bottom A-frame arm.

10. Wheel suspension according to claim 3, wherein the wheel carrier-sided bearing of the shock absorber strut lies closer to the wheel carrier-sided bearing of the steering tie rod than to the wheel carrier-sided bearing of the bottom A-frame arm.

11. Wheel suspension according to claim 5, wherein the wheel carrier-sided bearing of the shock absorber strut lies closer to the wheel carrier-sided bearing of the steering tie rod than to the wheel carrier-sided bearing of the bottom A-frame arm.

12. Wheel suspension according to claim 1, wherein the shock absorber strut is arranged approximately parallel to the vertical wheel center transverse plane.

13. Wheel suspension according to claim 8, wherein the shock absorber strut is arranged approximately parallel to the vertical wheel center transverse plane.

14. A wheel suspension for a driven rear wheel of a motor vehicle, comprising:

an inclined shock absorber strut;

a wheel carrier supporting a wheel;

two open wishbones arranged above a spin axis of the wheel and diverging away from the wheel, said wishbones hingedly connecting the wheel carrier to a vehicle body and being hinged to the wheel carrier on both sides of a vertical wheel center transverse plane, an A-frame arm arranged below the spin axis and hinged to the wheel carrier and the vehicle body in front of the vertical wheel center transverse plane, said A-frame arm being located in an inclined plane formed in a direction of travel; and a steering tie rod mounted on the wheel carrier behind the wheel center transverse plane and below the spin axis;

wherein an elastokinematic axis and a kinematic trailing axis are formed at the wheel;

wherein for all forces acting on the wheel, coordinated bearing characteristics of the wishbones, A-frame arm and tie rod and the position of the elastokinematic axis in interaction with the trailing axis result in an ideal swivel axis for the wheel;

wherein predetermined directions of movement of two bearings of the wishbones and A-frame arm at the wheel carrier result in pole rays, which meet in front of the wheel and above a horizontal plane running through the spin axis, and form a pitching pole for antidive and antisquat; and wherein an ideal upper pole, formed at an intersection of the longitudinal axes of the wishbones, for the kinematic trailing axis lying outside a track width lies in the vertical wheel center transverse plane.

15. A method of making a wheel suspension for a driven rear wheel of a motor vehicle with an inclined shock absorber strut, comprising:

supporting a wheel via a wheel carrier connected to the vehicle by wheel guide members, which are spaced vertically apart from each other;

arranging the wheel guide members above and below a horizontal plane running through a spin axis; and mounting the wheel guide members on the wheel carrier and a vehicle body, whereby an elastokinematic axis and a kinematic trailing axis are formed at the wheel;

wherein the wheel guide member arranged above the spin axis comprises two open wishbones, which diverge in a direction of body-sided bearings, are disposed in two planes, which are spaced apart, and are hinged to the wheel carrier on both sides of a vertical wheel center transverse plane on wheel carrier-side bearings at upper wishbone bearing points;

wherein the wheel guide member arranged below the spin axis, comprises an A-frame arm and a steering tie rod, the A-frame arm being hinged on body-side bearings at body-side bearing points in front of the vertical wheel center transverse plane, and located in an inclined plane, formed in a direction of travel, and mounted to the wheel carrier on an A-frame wheel carrier-side bearing at an A-frame bearing point;

wherein the steering tie rod is mounted on the wheel carrier on a wheel carrier-side bearing at a steering tie rod bearing point behind the wheel center transverse plane;

wherein for all forces acting on the wheel, coordinated bearing characteristics of the wheel guide members and the position of the elastokinematic axis in interaction with the trailing axis result in an ideal swivel axis for the wheel;

wherein predetermined directions of movement of the wheel carrier-sided bearings of two links of the wheel guide members result in pole rays, which meet in front of the wheel center transverse plane and above the horizontal plane running through the spin axis, and form a pitching pole for antidive and antisquat;

wherein an ideal upper pole for the kinematic trailing axis, which lies outside a track width, is formed at an intersection of the longitudinal axes of the two wishbones, a bottom point for the trailing axis is formed by the wheel carrier-side bearing of the A-frame arm, which is located in front of the vertical wheel center transverse plane and inside the track width, and the bearing points of the upper wishbones lie approximately in a vertical plane, which runs approximately parallel to the wheel center longitudinal plane and according to which the bearing points of the steering tie rod and the bottom A-frame arm lie in another vertical plane, which crosses the vertical plane, wherein the ideal upper pole, formed by the two upper wishbones, for the kinematic trailing axis lies also at the vertical wheel center transverse plane, and wherein a front wishbone of the two wishbones is arranged to cross the link arm of the bottom A-frame arm and also a rear wishbone of the two wishbones is arranged to cross the steering tie rod.

* * * * *